(12) United States Patent
Abdallah

(10) Patent No.: US 7,056,110 B2
(45) Date of Patent: Jun. 6, 2006

(54) APPARATUS FOR MAKING REINFORCEMENT PLY MATERIAL

(75) Inventor: David G. Abdallah, Akron, OH (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 56 days.

(21) Appl. No.: 09/973,125

(22) Filed: Oct. 8, 2001

(65) Prior Publication Data

US 2003/0096095 A1    May 22, 2003

(51) Int. Cl.
B29C 47/02    (2006.01)

(52) U.S. Cl. .................. 425/114; 425/380; 425/382 R; 118/405; 118/420

(58) Field of Classification Search .............. 425/131.1, 425/133.1, 133.5, 382 R, 114, 102, 380, 462; 118/405, 420
See application file for complete search history.

(56) References Cited

U.S. PATENT DOCUMENTS

| | | | |
|---|---|---|---|
| 2,105,812 A | 1/1938 | Gordon et al. ......... | 264/171.16 |
| 2,428,851 A | 10/1947 | Montamat ................... | 425/113 |
| 3,703,421 A | 11/1972 | Fisher ......................... | 156/166 |
| 3,880,558 A | 4/1975 | Breher et al. ............... | 425/115 |
| 4,132,756 A * | 1/1979 | Ferrentino et al. ..... | 264/171.16 |
| 4,150,929 A | 4/1979 | Brandt ........................ | 425/114 |
| 4,212,612 A | 7/1980 | Piper et al. ................ | 425/114 |
| 4,274,821 A * | 6/1981 | Kiemer ....................... | 425/114 |
| 4,277,642 A | 7/1981 | Piper et al. ............... | 174/117 F |
| 4,300,878 A * | 11/1981 | Ible ............................ | 425/114 |
| 4,563,140 A * | 1/1986 | Turecek ..................... | 425/114 |
| 4,934,100 A | 6/1990 | Adell .......................... | 49/462 |
| 4,948,354 A | 8/1990 | Minaudo .................... | 425/114 |
| 5,337,972 A | 8/1994 | Bhagwat et al. .......... | 242/129.8 |
| 5,766,384 A | 6/1998 | Kohno et al. ............... | 152/556 |
| 5,824,171 A * | 10/1998 | Miyazono et al. .......... | 152/526 |
| 5,855,703 A | 1/1999 | Okamoto et al. ........... | 152/527 |

FOREIGN PATENT DOCUMENTS

EP    1 213 121 A    6/2002

* cited by examiner

Primary Examiner—Joseph S. Del Sole
(74) Attorney, Agent, or Firm—Steven M. Auvil; Meredith E. Palmer

(57) ABSTRACT

An apparatus for making reinforcement ply material wherein reinforcement elements are grouped in untwisted sets and adjacent reinforcement elements in the same set are spaced apart a distance less than the distance between adjacent sets. The apparatus includes an extruder and a die head into which the extruder extrudes an elastomeric material. The die head defines a die throat and includes a guide insert which guides the reinforcement elements into the die throat. The guide insert has passages through which the reinforcement elements pass and which are arranged in a pattern corresponding to the arrangement of the reinforcement elements in the reinforced ply material.

11 Claims, 4 Drawing Sheets

US 7,056,110 B2

APPARATUS FOR MAKING REINFORCEMENT PLY MATERIAL

FIELD OF THE INVENTION

This invention relates generally to a reinforced ply material and more particularly to a reinforced ply material which can be used in the production of steel belts for pneumatic tires.

BACKGROUND OF THE INVENTION

Reinforced ply material commonly comprises an elastomeric (e.g. rubber) sheet and a plurality of reinforcement elements embedded therein. When the ply material is being used to make steel belts for radial tires, the reinforcement elements are usually cabled steel cords which are arranged in a planar row with uniform lateral spacing between the cords. Such ply materials are typically manufactured with an apparatus including a guide insert having passages through which the cabled steel cords pass. Specifically, the guide insert is positioned just upstream of a die throat so that the pattern of its passages dictates the arrangement of the cabled steel cords in the reinforced ply material and thus the steel belt.

SUMMARY OF THE INVENTION

The present invention reinforced ply material wherein steel monofilaments can be used as the reinforcement elements instead of cabled steel cords. When compared to cabled steel cord, steel monofilaments are economically made and require less rubber to coat in an extrusion process. Accordingly, the reinforced ply material of the present invention can provide an economic alternative for making reinforced ply material for the production of steel belts for pneumatic tires.

More particularly, the present invention provides reinforced ply material comprising an elastomeric sheet (e.g., rubber) and a plurality of reinforcement elements embedded therein. The reinforcement elements are grouped in untwisted sets and each set includes a plurality of reinforcement elements. Adjacent reinforcement elements in the same set are spaced apart an intra-set distance and adjacent reinforcement elements in different sets are spaced apart a greater inter-set distance. This arrangement of the reinforcement elements makes it possible to use untwisted groups of mono-filaments in place of cabled steel cords.

In an apparatus and/or method for making the reinforced ply material of the present invention, the reinforcement elements are guided according to the desired arrangement and the guided reinforcement elements are encapsulated in an elastomeric extrudate. The guiding function can be performed by a guide insert having passages arranged corresponding to the desired arrangement of the reinforcement elements in the ply material. For example, the guide insert can comprise a passage for each set of reinforcement elements and such passages can have circular or rectangular cross-sectional shapes. Alternatively, the guide insert can comprise a passage for each reinforcement element with the passages grouped in sets corresponding to the sets of reinforcement elements.

The present invention provides these and other features hereinafter fully described and particularly pointed out in the claims. The following description and drawings set forth in detail certain illustrative embodiments of the invention. These embodiments are indicative, however, of but a few of the various ways in which the principles of the invention can be employed.

DRAWINGS

DETAILED DESCRIPTION

Figure 1:
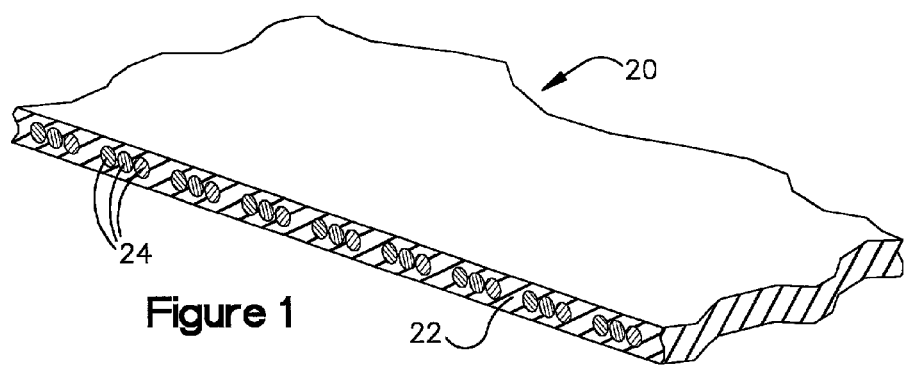
FIG. 1 is a perspective view, partly in section of reinforced ply material according to the present invention.

Referring now to the drawings and initially to FIG. 1, reinforced ply material 20 according to the present invention is shown. The ply material 20 comprises an elastomeric sheet 22 and a plurality of reinforcement elements 24 embedded therein. The sheet 22 can be made of rubber or any other suitable elastomer. The reinforcement elements 24 can be of any suitable material, however, the arrangement of the reinforcement elements 24 makes it possible to use steel monofilaments when the ply material is to be used to make steel belts for pneumatic tires.

In the ply material 20, the reinforcement elements 24 are positioned in one planar row, however, the spacing between each of the reinforcement elements 24 is not uniform. Instead, a plurality of parallel and untwisted reinforcement elements 24 are grouped in untwisted bundles or sets 26a, 26b, 26c, etc. Within each set 26, the intra-set distance between reinforcement elements 24 is preferably substantially the same. Also, the inter-set distance between adjacent but not-the-same-set reinforcements elements 24 (in other words the distance between adjacent sets 26) is preferably substantially the same. The inter-set distance is greater than the intra-set distance.

The number of sets 26, the number of reinforcement elements 24 in each set, the diameter FD of the elements 24, the intra-set distance, and/or the inter-set distance are selected to satisfy the requirements of the intended use of the reinforced ply material 20. For example, the ply material 20 can contain between about 100 and about 220 sets, between about 120 and about 200 sets, between about 140 and about 180 sets, and/or between about 150 and about 170 sets. Each set 26 can contains between 2 and 8 reinforcement elements 24, between 3 and 6 reinforcement elements 24, between 3 and 4 reinforcement elements, and/or 3 reinforcement elements 24. Each of the elements 24 has a diameter FD of about 0.20 mm to about 0.30 mm, about 0.22 mm to about 0.28 mm, about 0.24 mm to about 0.26 mm, about 0.25 mm, and/or about 0.26 mm. The intra-set distance is between about 0.00 mm (i.e., the elements are touching) and about 0.30 mm, between about 0.00 mm and about 0.26 mm, between about 0.00 mm and 0.20 mm, and/or between about 0.00 mm and about 0.10 mm. The inter-set distance is between about 0.25 mm and about 0.50 mm, between about 0.30 mm and about 0.45 mm, and/or between about 0.35 mm and about 0.40 mm.

Figure 2:
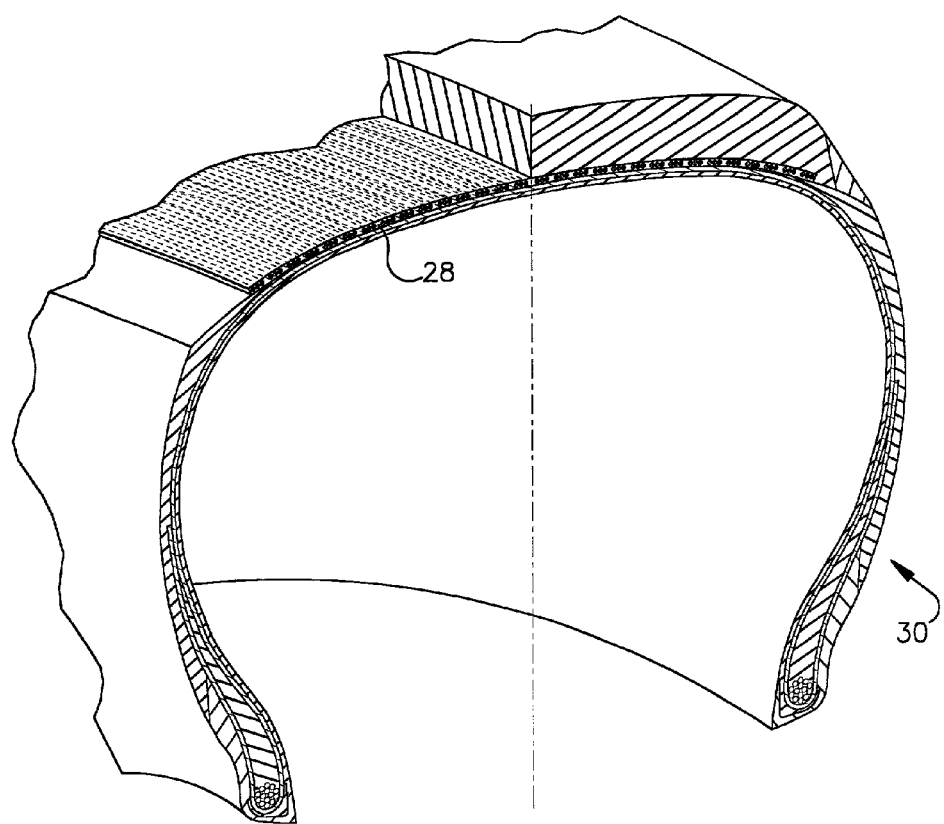
FIG. 2 is a cross-sectional view of a tire incorporating a steel belt made from reinforced ply material according to the present invention.
Figure 3:
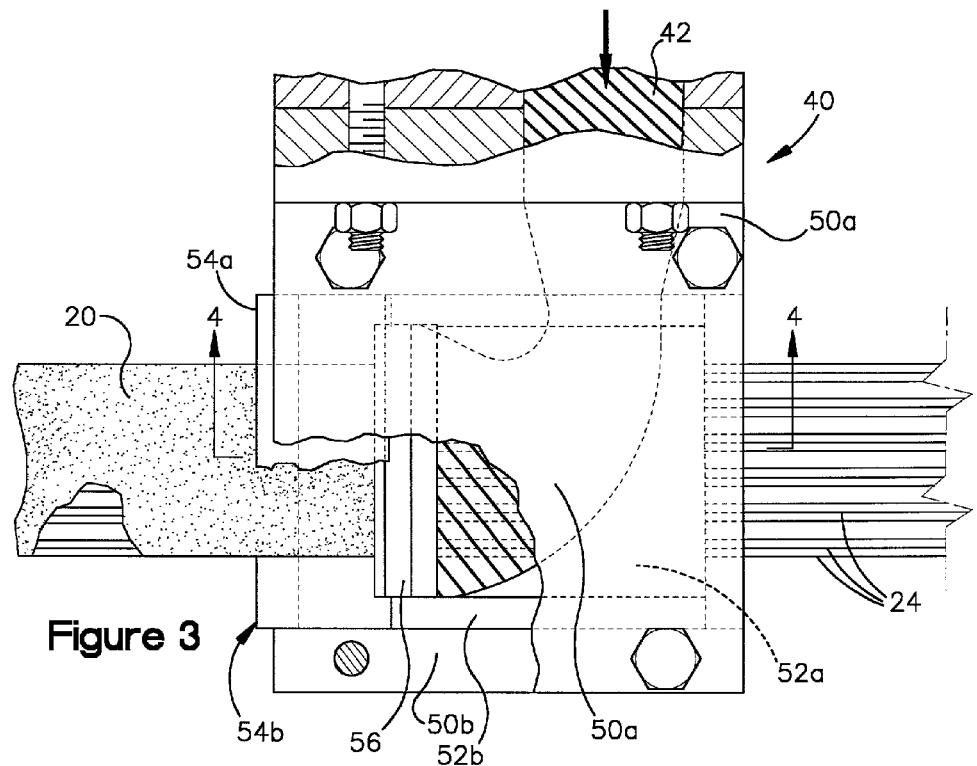
FIG. 3 is a plan view, partly broken away and in section, of an apparatus for making the reinforced ply material of the present invention.
Figure 4:
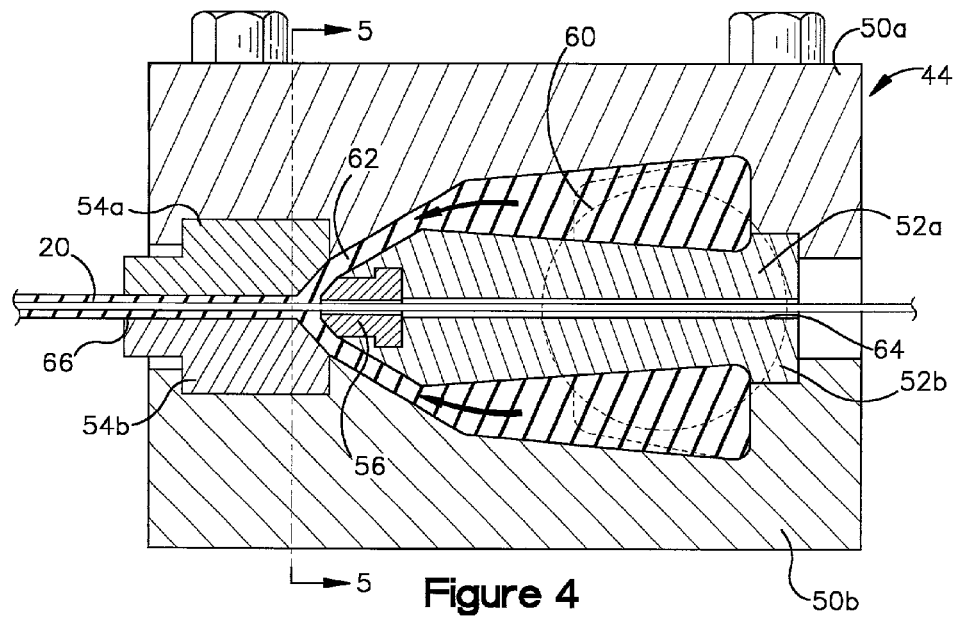
FIG. 4 is an enlarged sectional view taken on line 4—4 in FIG. 3.
Figure 5:
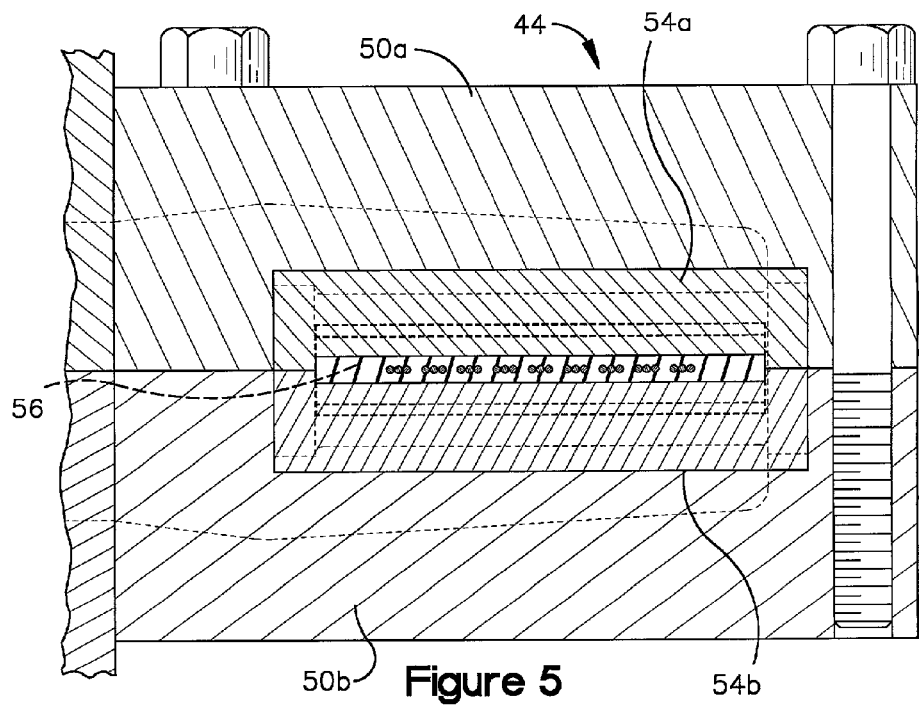
FIG. 5 is a sectional view taken on line 5—5 in FIG. 4.
Figure 6:
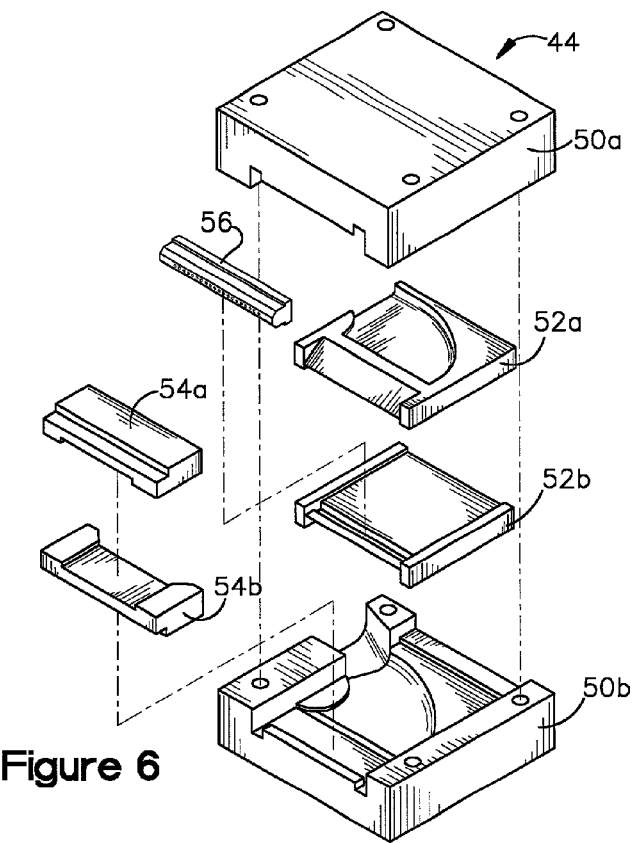
FIG. 6 is an exploded perspective view of a crosshead die of the apparatus.

In the illustrated and preferred embodiment, the ply material 20 has between 150 and 170 sets 26 and there are three reinforcement elements 24 in each set 26. The diameter FD of each of the reinforcement elements 24 is either about 0.25 mm or about 0.26 mm, the intra-set distance is between about 0.00 mm (i.e., touching) and about 0.20 mm, and the inter-set distance is between about 0.35 mm and about 0.40 mm. These groupings and dimensions are believed to be compatible with an extrusion manufacturing process and also acceptable for use of the ply material 20 as a steel belt in a pneumatic tire. Specifically, for example, the ply material 20 can be severed into strips, the strips oriented at preselected biases and stitched end-to-end to produce a steel belt 28 for a pneumatic tire 30 as shown in FIG. 2.

Other shapes of the sheet 22 and/or other arrangements of the reinforcement elements 24 are possible with and contemplated by the present invention. For example, although the illustrated ply material has a generally rectangular ribbon shape, other forms of the sheet (e.g., curved, tubular) can be used in certain circumstances. Additionally or alternatively, the sets can contain different numbers of reinforcement elements, reinforcement elements can be non-uniformly spaced within sets, and/or sets can be spaced apart varying distances from each other.

Referring now to FIGS. 3–6, an apparatus 40 for making the reinforcement ply material 20 according to the present invention is shown. The apparatus 40 includes an extruder 42 and a cross-head die 44 into which an elastomeric material is extruded. The reinforcement elements 24 enter the die 44 and are encapsulated with the extrude thereby forming a ribbon of reinforced ply material 20 which emerges from the opposite side of the die 44.

The die 44 comprises upper and lower die blocks 50a and 50b, mating die plates 52a and 52b, discharge bars 54a and 54b, and a guide insert 56. The die blocks 50 embrace the die plate 52 and the discharge bars 54 and the die plates 52 embrace the guide insert 56. Inner surfaces of the die blocks 50 and outer surfaces of the die plates 52 are complementally shaped to form an annual extrude channel 60 and a throat 62 around the die plates 52. Inner relatively flat surfaces of the die plates 52 form an emitting slot 64 from the rear of the die 44 to the guide insert 56. Inner relatively flat surfaces of the discharge bars 54 form a discharge slot 66 positioned just upstream the throat 52 and the guide insert 56.

During operation of the apparatus 40, the extruder 42 delivers the elastomeric material (e.g., rubber) and it flows under pressure through the channel 60, through the throat 62 and through the discharge slot 66. Simultaneously, the reinforcement elements 24 are moved though the passage 64, through the guide insert 56 and into the discharge slot 66. As the elements 24 emerge from the guide insert 56, they are encapsulated by the extrudate.

Figure 7:
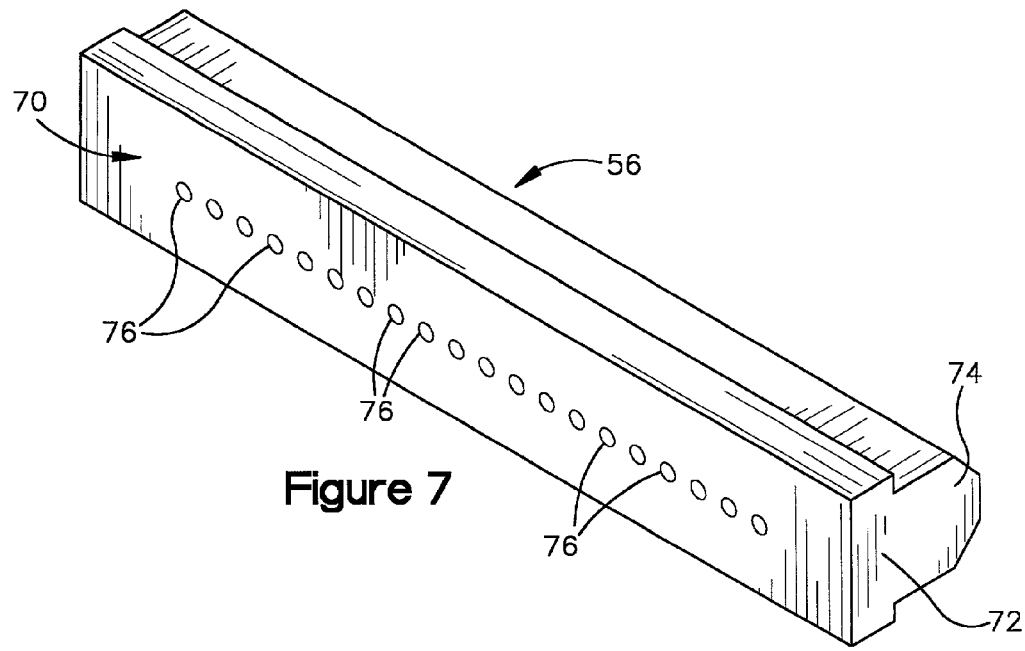
FIG. 7 is an isolated view of a guide insert of the crosshead die.

Referring now to FIG. 7, the guide insert 56 is shown isolated from the rest of the apparatus 40. The guide insert 56 has a body 70 having a rear portion 72 and a front portion 74, which together define guide passages 76. The insert's rear portion 72 is shaped and sized for inserted engagement with the die plates 52 and the insert's front portion 74 is shaped and sized to suitably define the die throat 62 and, to this end, has an arrow-like shape. The passages 76 extend from the end wall of the rear portion 72 to the apex of the front portion 74 (See FIG. 4.)

The passages 76 transversely and laterally guide the reinforcement elements 24 into the die throat 62 and thus define the position and spacing of the elements 24 in the reinforced ply material 20. Thus, the passages 76 are all transversely aligned on the same plane to form a single row of reinforcement elements 24. Also, the lateral spacing of the passages 76 corresponds to the desired lateral spacing the elements 24, that is, in the preferred and illustrated embodiment, uniformly spaced sets 26 of the elements 24.

Figure 8:
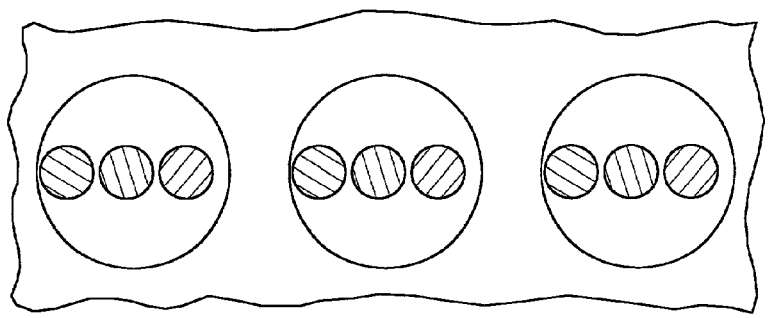
FIG. 8 is an enlarged schematic view of front end of the guide insert showing one possible arrangement of passages and reinforcement elements passing therethrough.

Referring now to FIG. 8, one possible configuration for the guide passages 76 is shown. In this insert configuration, the passages 76 are circular in cross-section and three reinforcement elements 24 pass through each passage 76 to form one set 26 of elements. Each of the passages 76 has a hole diameter HD which accommodates the parallel positioning of three elements 24 with an appropriate cushion (e.g., about 10%, 15% or 20% FD.) Intra-set elements 24 can touch (i.e., the intra-set distance is about 0.00 mm) in this arrangement and insert manufacture is similar to that of conventional guide inserts for cabled steel cords. The open spaces above and below the reinforcement elements (in the illustrated orientation) may increase the potential for twisting and/or transverse misalignment between intra-set reinforcement elements 24. Tension-maintaining devices and/or rollers can be employed to keep the elements 24 co-planar as they enter and pass through the guide insert 56.

Figure 9:
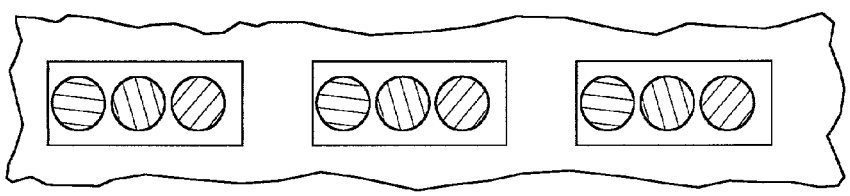
FIG. 9 is a view similar to FIG. 8, showing another possible arrangement of passages and reinforcement elements passing therethrough.

Referring now to FIG. 9, another insert configuration is shown in which the passages 76 have rectangular cross-sections. As with the configuration shown in FIG. 8, three reinforcement elements 24 pass through each passage 76 to form one set 26 of elements. Each of the passages 76 has a hole diameter HD (e.g., the length of the rectangle) which accommodates the parallel positioning of three elements 24 with an appropriate cushion. When compared to the circular passages, the rectangular shape eliminates the space above and below the elements 24 thereby minimizing the potential for transverse misalignment. However, this insert design may be more difficult and/or more expensive to manufacture.

In the insert configurations shown in FIGS. 8 and 9, the passages 76 are spaced apart, or have an external land area EL, corresponding to the inter-set distance of the reinforcement elements 24. The number of sets 26 of reinforcement elements is dictated by the maximum span (i.e., greatest allowable lateral distance between the first and last passage) of the insert and the diameter FD of the reinforcement elements 24. For example, for an insert having 203.2 mm span (8 inches) and reinforcement elements 24 having an 0.25 diameter, 168 sets would be used. For the same insert span with reinforcement elements 24 having an 0.26 diameter, 157 sets would be used. Some sample specification calculations are as follows:

| Cushion | HD (mm) | Σ HD (mm) | Σ Non-HD (mm) | EL (mm) | EL/FD |
|---|---|---|---|---|---|
| | | Span = 203.2 mm | | | |
| | | FD = 0.25 mm | | | |
| | | 168 Sets | | | |
| 10% | 0.825 | 138.81 | 64.39 | 0.39 | 1.54 |
| 15% | 0.863 | 145.12 | 58.08 | 0.35 | 1.39 |
| 20% | 0.900 | 151.42 | 51.78 | 0.31 | 1.24 |
| | | Span = 203.2 mm | | | |
| | | FD = 0.26 mm | | | |
| | | 157 Sets | | | |
| 10% | 0.858 | 134.94 | 68.26 | 0.44 | 1.68 |
| 15% | 0.897 | 141.08 | 62.12 | 0.40 | 1.53 |
| 20% | 0.936 | 147.21 | 55.99 | 0.36 | 1.38 |

In addition to providing the inter-set land distance EL between adjacent sets 26, the table displays the resulting ratio EL/FD which represents the size of the space between sets (EL) relative to the diameter of the reinforcement element (FD). If the reinforcement ply 20 is to be used for steel belts, a larger ratio is believed to be desirable. Thus, using a 10% cushion produces the best two specifications, with the 0.26 mm diameter producing the better of these two. Along this line, it is noted that when cabled steel cord is being used, the cushion is usually about 0.152 mm larger than the cord to accommodate welds. However, if steel monofilament without welds are used for the reinforcement elements 24, this cushion can be reduced considerably. Thus, with steel monofilaments, the smaller cushion (e.g., 10%) can be used thereby increasing the EL/FD ratio.

Figure 10:
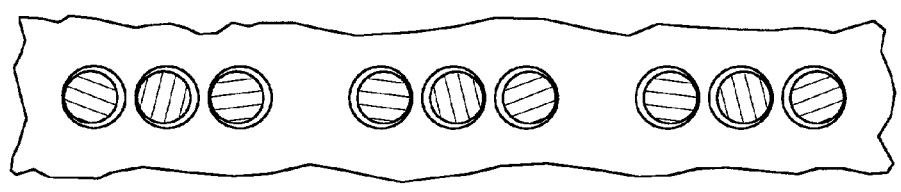
FIG. 10 is a view similar to FIGS. 8 and 9, showing a further possible arrangement of passages and reinforcement elements passing therethrough.

Referring now to FIG. 10, a further passage configuration for the insert 56 is shown. In this insert configuration, a passage 76 is provided for each reinforcement element 24 and the passages are grouped in sets of three. This design has the advantage of assuring the co-planar positioning of the elements 24 in a single row. This design has the disadvantages of not allowing the intra-set reinforcement elements 24 to touch (ie., the intra-set distance is greater than about 0.00 mm). Also, this design can also be more complicated and/or more expensive than designs in which intra-set reinforcement elements share the same passage.

The inter-set land area EL in this embodiment corresponds to the distance between adjacent sets of passages and the internal land area IL corresponds to the distance between intra-set passages. In designing the insert 56, the inter-set land area EL is compared to the span of each passage set or, in other words, the sum of diameters of the holes and sum of the internal land area (IL) between the holes. A significant design factor is that there is a minimum distance (e.g., between 0.110 mm and 0.254 mm) which can be achieved between holes and this distance represents the lower limit of the IL dimension. This design limitation can be the controlling factor in the selection of set-to-set spacing. As shown in the sample specifications below, some designs are not possible because the EL dimension would have to be negative or less than this minimum distance.

| Cushion | HD (mm) | IL (mm) | Σ HD + Σ IL (mm) | Σ Non-HD (mm) | EL (mm) | EL/IL | EL/FD |
|---|---|---|---|---|---|---|---|
| | | | Span = 203.2 mm | | | | |
| | | | FD = 0.25 mm | | | | |
| | | | 168 Sets | | | | |
| 10% | 0.275 | 0.254 | 224.28 | −21.08 | — | — | — |
| | | 0.127 | 181.54 | 21.66 | 0.13 | 1.02 | 0.52 |
| | | 0.110 | 175.82 | 27.38 | 0.16 | 1.49 | 0.65 |
| 15% | 0.288 | 0.254 | 230.59 | −27.39 | — | — | — |
| | | 0.127 | 187.85 | 15.35 | 0.09 | 0.72 | 0.37 |
| | | 0.110 | 182.13 | 21.07 | 0.13 | 1.15 | 0.50 |
| 20% | 0.300 | 0.254 | 236.90 | −33.70 | — | — | — |
| | | 0.127 | 194.16 | 9.04 | 0.05 | 0.43 | 0.22 |
| | | 0.110 | 188.44 | 14.76 | 0.09 | 0.80 | 0.35 |
| | | | Span = 203.2 mm | | | | |
| | | | FD = 0.26 mm | | | | |
| | | | 157 Sets | | | | |
| 10% | | 0.254 | 214.84 | −11.64 | — | — | — |
| | | 0.127 | 174.89 | 28.31 | 0.18 | 1.43 | 0.70 |
| | | 0.110 | 169.54 | 33.66 | 0.22 | 1.96 | 0.83 |
| 15% | | 0.254 | 220.97 | −17.77 | — | — | — |
| | | 0.127 | 181.03 | 22.17 | 0.14 | 1.12 | 0.55 |
| | | 0.110 | 175.68 | 27.52 | 0.18 | 1.60 | 0.68 |
| 20% | | 0.254 | 227.11 | −23.91 | −0.15 | — | — |
| | | 0.127 | 187.16 | 16.04 | 0.10 | 0.81 | 0.39 |
| | | 0.110 | 181.81 | 21.39 | 0.14 | 1.24 | 0.53 |

In these calculations, the EL/IL represents the relation between the inter-set distance (EL) and the intra-set distance (IL). (Accordingly, if this ratio equals one, the reinforcement elements 24 are all equally spaced.) It is believed that when the reinforced ply material 20 is used for the production of steel belts 28, this ratio should be as high as possible thereby making the 10% cushion with the smallest possible internal land IL dimension the best candidates. Again, if the reinforcement elements 24 are "weld-less" steel monofilaments (as opposed to cabled steel cord), a 10% cushion can be possible.

One can now appreciate that present invention provides a reinforced ply material 20 and a method of making the same which allows the use of steel monofilaments for the reinforcement elements 24. Although the invention has been shown and described with respect to certain embodiments, it is obvious that equivalent alterations and modifications will occur to others skilled in the art upon the reading and understanding of this specification. The present invention includes all such alterations and modifications and moreover is limited only by the scope of the following claims.

The invention claimed is:

1. An apparatus for making reinforcement ply material comprising an elastomeric sheet and a plurality of reinforcement elements embedded therein; wherein the reinforcement elements are grouped in untwisted sets and each set contains a plurality of reinforcement elements; wherein adjacent reinforcement elements in the same set are spaced apart an intra-set distance and adjacent reinforcement elements in different sets are spaced apart an inter-set distance; and wherein the inter-set distance is greater than the intra-set distance; the apparatus comprising:

an extruder and a die head into which the extruder extrudes an elastomeric material;

wherein the die head defines, at least in part, a die throat and includes a guide insert which guides the reinforcement elements into the die throat;

wherein the guide insert comprises passages through which the reinforcement elements pass and which are arranged in a pattern corresponding to the arrangement of the reinforcement elements in the reinforced ply material, such that one passage is provided for each set of reinforcement elements;

wherein each passage is substantially rectangular in cross-sectional shape; and wherein each passage, alone, is configured to guide the reinforcement elements of one of the sets of reinforcement elements into the die throat and to define the position and spacing of the reinforcement elements of such set of reinforcement elements in the reinforcement ply material.

2. The apparatus of claim 1, wherein each passage has a uniform, substantially rectangular cross-section substantially along its entire length.

3. The apparatus of claim 1, wherein the lateral distance between passages is between about 0.20 mm and about 0.50 mm.

4. An apparatus for making reinforcement ply material that includes an elastomeric sheet and a plurality of reinforcement elements embedded therein, the reinforcement elements being grouped in sets such that each set includes at least two reinforcement elements, wherein adjacent reinforcement elements in the same set are spaced apart an intra-set distance and adjacent reinforcement elements in different sets are spaced apart an inter-set distance that is greater than the intra-set distance, the apparatus comprising:

an extruder and a die head into which the extruder extrudes an elastomeric material;

the die head defining, at least in part, a die throat and including a guide insert, the guide insert including a plurality of passages through which the reinforcement elements pass, the passages being arranged in a pattern corresponding to the arrangement of the reinforcement elements in the reinforced ply material such that one passage is provided for each set of reinforcement elements;

wherein each passage is configured to guide the reinforcement elements of one of the sets of reinforcement elements into the die throat; and wherein each passage has a uniform, substantially rectangular cross-section substantially along its entire length.

5. The apparatus of claim 4, wherein the lateral distance between passages is between about 0.20 mm and about 0.50 mm.

6. An apparatus for making reinforcement ply material that includes an elastomeric sheet and a plurality of reinforcement elements embedded therein, the reinforcement elements being grouped in sets such that each set includes at least two reinforcement elements, wherein adjacent reinforcement elements in the same set are spaced apart an intra-set distance and adjacent reinforcement elements in different sets are spaced apart an inter-set distance that is greater than the intra-set distance, the apparatus comprising:

an extruder and a die head into which the extruder extrudes an elastomeric material;

the die head defining, at least in part, a die throat and including a guide insert, the guide insert including a plurality of passages through which the reinforcement elements pass, the passages being arranged in a pattern corresponding to the arrangement of the reinforcement elements in the reinforced ply material such that one passage is provided for each set of reinforcement elements;

wherein each passage is configured to guide the reinforcement elements of one of the sets of reinforcement elements into the die throat and to define the position and spacing of the reinforcement elements of one of such set of reinforcement elements in the reinforcement ply material, wherein each passage includes a front end having a substantially rectangular cross-section and a rear end having a substantially rectangular cross-section, the substantially rectangular cross-section of the front end of each passage having substantially the same dimensions as the substantially rectangular cross-section of the rear end of each passage.

7. The apparatus of claim 6, wherein each passage has uniform rectangular cross-section along its length.

8. The apparatus of claim 6, wherein the lateral distance between passages is between about 0.20 mm and about 0.50 mm.

9. The apparatus of claim 3, wherein the lateral distance between passages is between about 0.30 mm and about 0.45 mm.

10. The apparatus of claim 5, wherein the lateral distance between passages is between about 0.30 mm and about 0.45 mm.

11. The apparatus of claim 8, wherein the lateral distance between passages is between about 0.30 mm and about 0.45 mm.

\* \* \* \* \*

UNITED STATES PATENT AND TRADEMARK OFFICE
CERTIFICATE OF CORRECTION

| | | |
|---|---|---|
| PATENT NO. | : 7,056,110 B2 | Page 1 of 1 |
| APPLICATION NO. | : 09/973125 | |
| DATED | : June 6, 2006 | |
| INVENTOR(S) | : David G. Abdallah | |

It is certified that error appears in the above-identified patent and that said Letters Patent is hereby corrected as shown below:

In column 1, line 31, insert the word --provides-- between the words "invention" and "reinforced."

In column 1, line 34, insert the word --more-- between the words "are" and "economically."

In column 8, line 39, insert --a-- between "has" and "uniform."

Signed and Sealed this

Third Day of April, 2007

JON W. DUDAS
*Director of the United States Patent and Trademark Office*